United States Patent [19]

Merkin

[11] Patent Number: 5,515,616
[45] Date of Patent: May 14, 1996

[54] SEAL SPLITTER GAGE

[75] Inventor: Robert A. Merkin, Nacogdoches, Tex.

[73] Assignee: JM Clipper Corporation, Nacogdoches, Tex.

[21] Appl. No.: 286,465

[22] Filed: Aug. 5, 1994

[51] Int. Cl.[6] .................................................. G01B 3/16
[52] U.S. Cl. ............................. 33/558.04; 33/558.01; 277/9
[58] Field of Search .................. 33/465, 471, 558.01, 33/558.4, 558.04, 558.07, 27.02; 277/9, 11, 216

[56] References Cited

U.S. PATENT DOCUMENTS

| 704,263 | 7/1902 | Luck. | |
|---|---|---|---|
| 1,633,875 | 6/1927 | Sweeney | 33/471 X |
| 1,839,014 | 12/1931 | De Guerre. | |
| 2,174,106 | 9/1939 | Houck. | |
| 3,128,944 | 4/1964 | Gabriel. | |
| 4,157,833 | 6/1979 | Kozlowski | 277/9 |
| 5,087,057 | 2/1992 | Kurkowski | 277/216 X |

FOREIGN PATENT DOCUMENTS

| 1215075 | 4/1960 | France | 33/558.04 |
|---|---|---|---|
| 787000 | 11/1957 | United Kingdom | 33/558.05 |

Primary Examiner—Thomas B. Will
Attorney, Agent, or Firm—Dickstein, Shapiro & Morin

[57] ABSTRACT

A gage for splitting annular seals by establishing two points on a seal's outer edge for cutting lines, and planes through which the cuts should extend. The gage includes two pivotally connected arms equipped with collar assemblies. The collar assemblies include contact edges and offset angle plates. The seal abuts against the contact edges to properly orient the gage and seal. The offset angle plates establish the cutting lines. The gage includes feet which position the gage to stand over the seal.

9 Claims, 7 Drawing Sheets

SEAL SPLITTER GAGE

BACKGROUND OF THE INVENTION

The present invention relates to gages and more particularly to a gage that establishes cutting guide lines for annular seals of given inside and outside diameters to resize them to fit unique specifications.

Annular seals are ring shaped elastomeric devices used to seal the space between a rotating shaft and its surrounding casing or to seal the joint between two cylindrical sections. Annular seals are typically manufactured in standard diameter sizes. In the event one of the standard sizes does not fit a seal diameter requirement for a particular application, the user may resize a larger seal to fit the unique specification. Resizing may also be performed when one of the standard sizes will fit, but the user is out of stock and cannot wait to resupply.

The process of resizing or splitting an annular seal to a smaller diameter involves cutting a segment out of the circumference of the larger seal. Annular seals are typically made of flexible elastomeric materials. Thus, even though the seal has been cut, when the end surfaces of the split seal are held together in compression, a good seal can be maintained. When the seals are cut, they may be cut along the lines at an angular offset with a radial line to provide an appropriate interference fit along the joined dynamic sealing surfaces.

The appropriate seal cutting lines may be established by determining, either by calculation or reference to a table of standards, both a displacement angle A and an angular offset O. First, the user determines the required angular displacement A between the two cut lines by the following formula:

$$A(degrees) = 360 * (OD_1 - OD_2)/(OD_1),$$

where $OD_1$ = outer diameter of large seal before cutting, and $OD_2$ = desired outer diameter of split seal after cutting.

When a seal is correctly installed into a bore, the seal lip has a smaller inside diameter than the outside diameter of the shaft so that when the shaft is inserted into the seal, the circumference of the lip is increased. If the offset angle is incorrect, the ends of the lip can either separate, leaving a gap, or compress together excessively to the extent that a bulge is formed at the junction of the ends. Either situation can cause the seal to leak. The user must, therefore, refer to a table specifying the proper offset angle or calculate it for each situation. A formula used to calculate the offset angle is:

Offset Angle O (degrees) = (½ the desired compression at the ID of the lip ends) /[$(OD_2 - ID_2)/2$], where $OD_2$ = desired outer diameter of split seal after cutting, and $ID_2$ = desired inner diameter of split seal after cutting.

Typical desired compressions are:

| Shaft Size | Compression |
| --- | --- |
| Up to 10" | .030" |
| 10 to 20" | .045" |
| 20 to 40" | .060" |

In practice, a degree or two is added to O to ensure an interference fit at the inner edge at the dynamic sealing surface.

The above-described technique for splitting seals requires accurate calculation, determination of the cutting lines, and cutting. This is a disadvantage because it requires someone in the field who understands how to perform the calculation. Moreover, even after angles A and O are determined, it is difficult to quickly and accurately mark the seal to make the cuts. No known structure provides an uncomplicated method of resizing annular seals. Thus, there exists a need to provide a quick and easy method of establishing cutting lines to resize annular seals for unique applications.

SUMMARY OF THE INVENTION

The disadvantages of the prior art are alleviated to a great extent by the present invention which provides a seal gage including two pivotally connected arms equipped with collar assemblies to properly orient the seal with respect to the apparatus and provide cutting edges. In operation, the two scale arms establish the calculated displacement angle. The displacement between the scale arms may be read from a gear driven dial coupled to the connection of the scale arms or read from angular gradations etched into the guide bar. Offset plates, found on the slidable collars, add the angular offset from the radial lines established by the pivotally connected arms. The offset angles ensure a proper interference fit along the dynamic sealing surface. Thus, the invention provides accurate cutting guide lines to customize the annular seal.

It is an object of the present invention to provide a seal splitter gage which has a basic sturdy design.

It is a further object of the present invention to provide a seal splitter gage which is relatively lightweight.

It is still another object of the present invention to provide a gage which finds application for seals of a variety of sizes and yet is not complicated to use. The present invention is particularly well suited for splitting seals with outside diameters within a range of from about three and one-half inches to forty inches.

With these and other objects, advantages and features of the invention that may become apparent, the nature of the invention may be more clearly understood by reference to the following detailed description of the invention, the appended claims and the several drawings attached hereto.

DETAILED DESCRIPTION OF PREFERRED EMBODIMENTS

Figure 1:
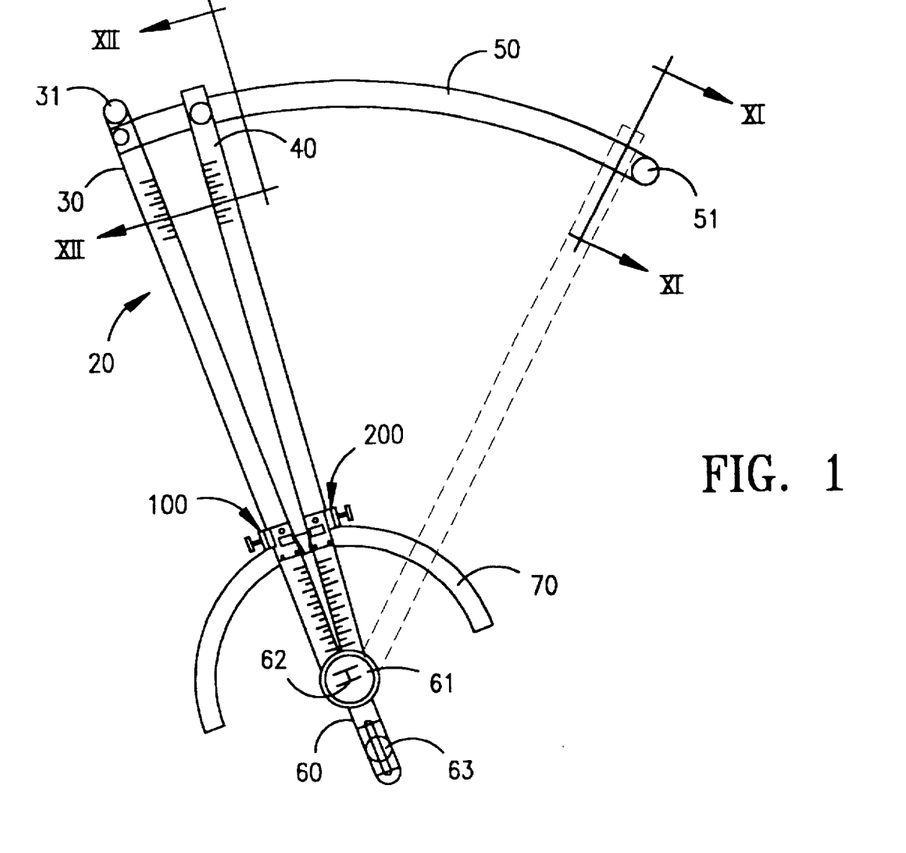
FIG. 1 is a plan view of a gage constructed in accordance with a preferred embodiment of the present invention.

Referring to the drawings, FIG. 1 shows a gage 20 constructed in accordance with a preferred embodiment of the present invention. A fixed scale arm 30 is rigidly connected at one end to a protractor dial assembly 60. The assembly 60 includes a protractor dial 61. The dial 61 may be, for example, of the type manufactured by the L. S. Starrett Co., Athol, Mass., #901034. The other end of the fixed scale arm 30 is rigidly connected to a guide bar 50. The guide bar 50 spans an arc segment whose center is at the hinge point 62, located at the center of the protractor dial 61.

A pivoting scale arm 40 is pivotally connected to the protractor dial assembly 60 at the hinge point 62. The pivoting scale arm 40 is connected to the guide bar 50 by a collar 41 permitting free angular travel of the pivoting arm 40 with respect to the fixed scale arm 30. The pivoting scale arm 40 establishes the proper angular displacement A between the arm 40 and the fixed scale arm 30 to resize the seal 70. The pivoting scale arm 40 is pivotable between the closed position shown in solid lines in FIG. 1 and the fully open position shown in dashed lines in FIG. 1.

Although it may serve as a less precise indicator of angle A than the dial 61, angular gradations may be marked on the guide bar 50 as an alternative to the protractor dial 61 or as a way to double check the function of the protractor dial 61. The dial 61 and the angular gradations are examples of protractor means for the present invention.

The fixed scale arm 30, the pivoting scale arm 40 and the guide bar 50 are all located within substantially one plane. Consequently, the fixed scale arm 30 is substantially hidden from view in FIG. 2. The sliding collar 41 for the guide bar 50 has a coupling screw for fixing the pivoting scale arm 40 to the guide bar 50 at the discretion of the user, as described in more detail below in connection with FIG. 12. A fixed arm gage foot assembly 31, a guide bar gage foot assembly 51, and a protractor gage foot assembly 63 permit the gage 20 to stand over the seal 70 on a flat surface 71.

As shown in FIG. 1, both the fixed scale arm 30 and the pivoting scale arm 40 are equipped with sliding locator collar assemblies 100, 200. The collar assemblies 100, 200 freely travel the length of, and may be tightened to, the respective scale arms 30, 40. The seal 70 is positioned against the locator collar assemblies 100, 200 once the assemblies 100, 200 are tightened to the scale arms 30, 40.

Figure 3:
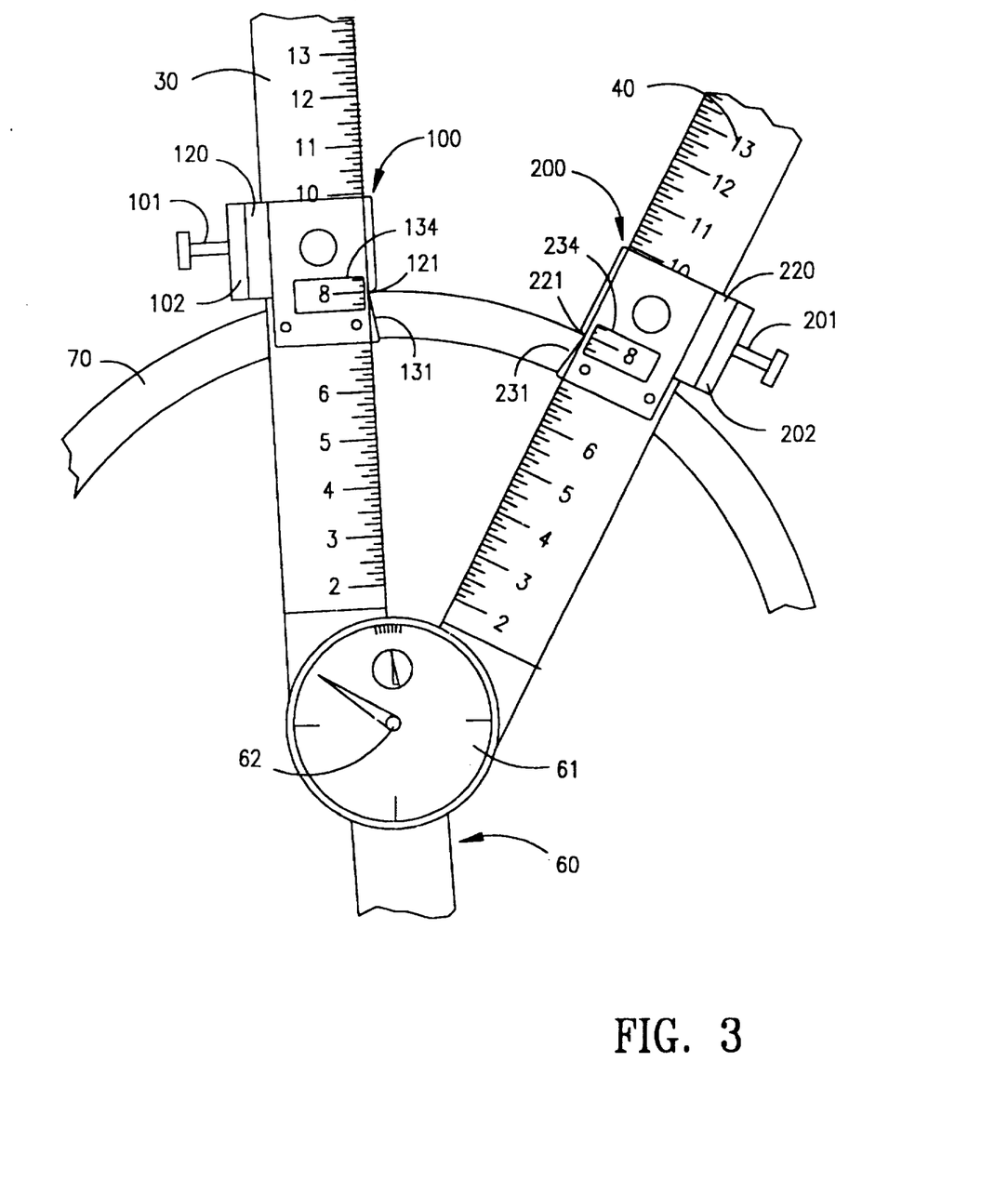
FIG. 3 is a larger scale plan view showing the collar assemblies of the gage of FIG. 1.

FIG. 3 illustrates in more detail the positioning of the left-handed locator collar assembly 100, the right-handed collar assembly 200, and the seal 70. In operation, the user fixes the locator collar assemblies 100, 200 to the respective scale arms 30, 40 by lateral thumb screws 101, 201. Each thumb screw 101, 201 extends through a threaded aperture in a respective locator block plate 102, 202, which is in turn bolted to a locator block 120, 220.

In operation, the user fixes the collar assemblies 100, 200 to the scale arms 30, 40 at a distance which corresponds to the original outer diameter of the seal 70. FIG. 3, for example, shows the gage 20 positioned to resize a seal 70 with an eight inch original outer diameter. The seal 70 abuts against the locator collar assemblies 100, 200 at seal contact edges 121, 221. Offset angle edges 131, 231 provide the cutting or cut line marking guide lines.

When the gage 20 is used to cut the illustrated eight inch outer diameter seal 70 down to a six inch diameter seal, the collars 100, 200 are positioned on the arms 30, 40 with the numeral "8" showing in the middle, or at an indicator mark, in the windows 134, 234 of the collars 100, 200. The arms 30, 40 are positioned so that the appropriate angle A is shown by the protractor dial 61.

The angle A may be calculated using formulas or by use of a chart that may be provided with the gage 20. The appropriate offset angle O is also determined using formulas or the provided chart, and the appropriate offset angle plates 131, 231 are chosen and positioned on the collar assemblies 100, 200. The seal 70 is then placed in position against the contact edges 121, 221.

If it appears that the diameter of the seal 70 results in the foot 63 (FIG. 1) being in the way, the foot 63 may be loosened and positioned within protractor slot 65 (FIG. 10) to be inside or outside of the seal 70. For clarity of illustration, the foot 63 is not shown in FIG. 10.

Once the seal 70 is in position, with the seal 70 contacting the edges 121, 221 (FIG. 3), marks may be drawn or otherwise made on the seal 70 along the offset angle edges 131, 231. The marks may be made with an appropriate marking instrument or could be cuts to indicate where subsequent cutting of the seal 70 should take place. Alternatively, while the seal 70 is in the FIG. 3 position, an operator could immediately cut through the seal 70 along the edges 131, 231.

Figure 4:
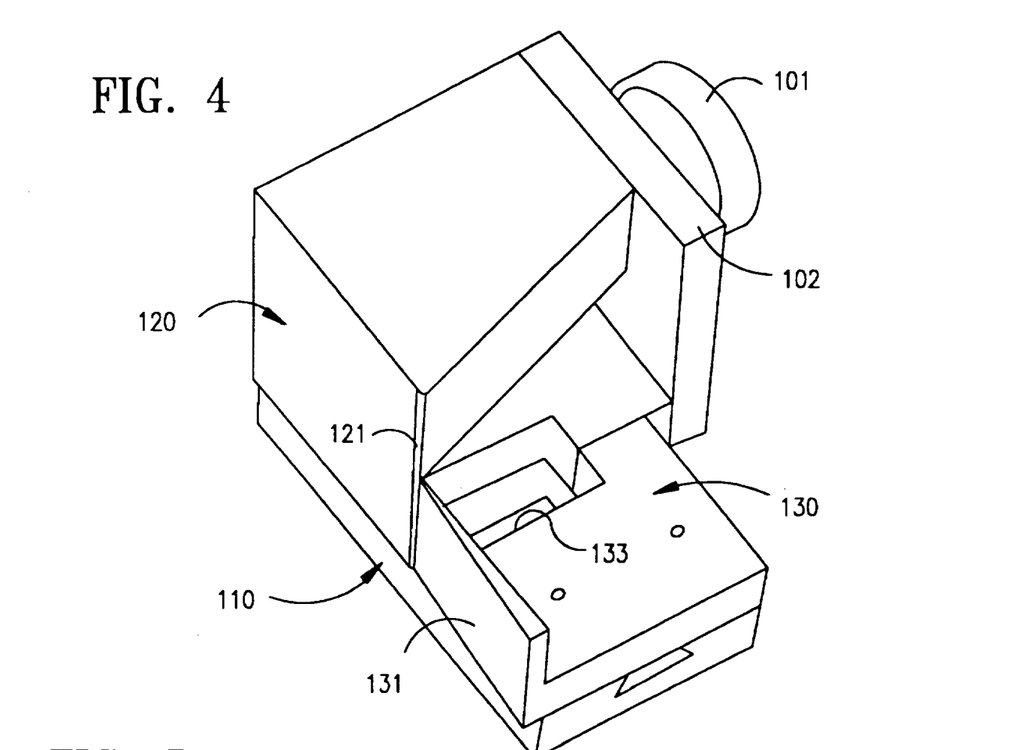
FIG. 4 is a perspective view of the bottom of the left-hand collar assembly of the gage of FIG. 3, seen from the front lower left corner.

As shown in FIG. 4, the collar assembly 100 has five principal parts. A locator block 120, when assembled with a locator block plate 102, forms a scale arm channel 126 (FIG. 7), through which the scale arm 30 (not shown in FIG. 4) is disposed. The locator block 120 supports the dovetail plate 110 on its front face. A dovetail screw 113 (FIG. 5) fixes the dovetail plate 110 to the locator block 120 when the plate 110 and block 120 are in proper alignment. An offset angle plate 130 is suspended from the back side of the dovetail plate 110. Thus, the offset angle plate 130 and the front face of the locator block 120 are substantially coplanar. The offset angle plate 130 is configured so as not to interfere with the scale arm 30 which is disposed within the arm channel 126.

Figure 5:
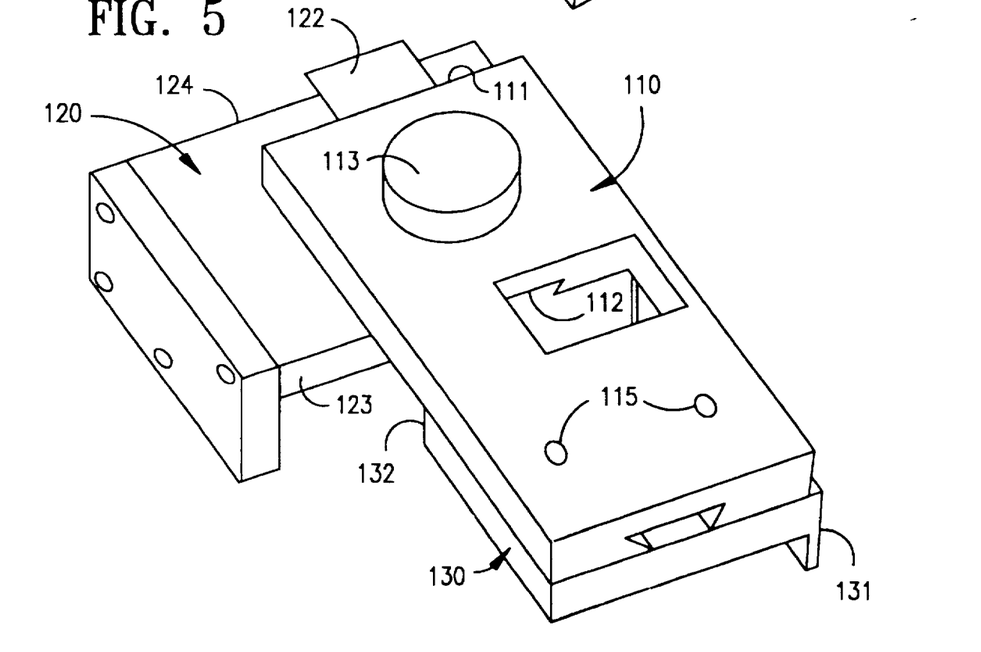
FIG. 5 is a perspective view of the collar assembly of FIG. 4 in a partially disassembled position.

FIG. 5 demonstrates the interaction between the dovetail plate 110 and the locator block 120. These units 110, 120 are coupled by a dovetail tab 122 and dovetail slot 112. Note that FIG. 5 shows the collar assembly 100 in a partially assembled configuration. In typical use, the dovetail plate 110 slides all the way down the locator block 120 until the top offset angle plate surface 132 contacts the bottom locator block surface 123. At this point the top dovetail plate surface 111 and the top locator plate surface 124 are substantially coplanar. Once the dovetail plate 110 and the locator block 120 are properly assembled, the dorsal thumb screw 113 fixes the dovetail plate 110 to the locator block 120.

Figure 6:
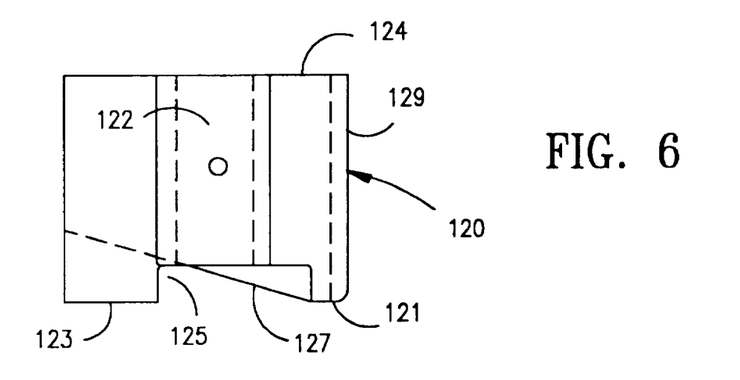
FIG. 6 is a top view of the locator block of the collar assembly of FIGS. 4 and 5.
Figure 7:
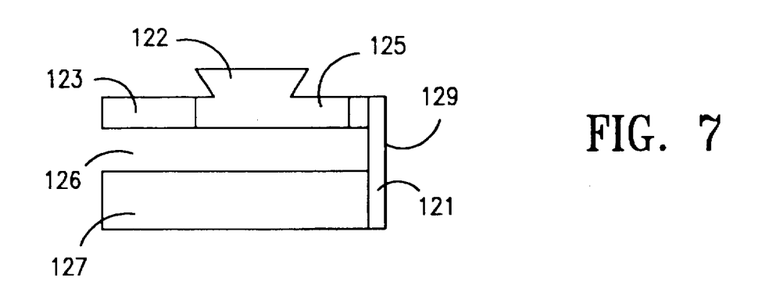
FIG. 7 is a front view of the locator block of FIG. 6.

The locator block 120, shown in FIG. 6, establishes the seal contact edge 121 and dovetail tab 122 previously discussed. The locator block 120 also includes a half window cutout 125 formed on the bottom locator block surface 123, to permit the user to see the scale arm 30. The scale arm 30 extends through the arm channel 126 (FIG. 7).

When the locator block plate 102 (FIG. 3) is bolted to the left side (FIGS. 6 and 7) of the locator block 120, the scale arm 30 is enclosed within the arm channel 126. To insure contact between the locator block 120 and the seal 70 at only one point, the rear surface 127 of the locator block 120 forms an acute angle with the right side 129 of the locator block 120 at the seal contact edge 121.

Figure 8:
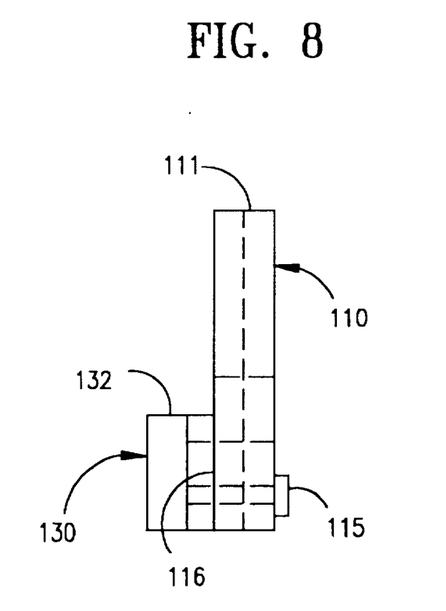
FIG. 8 is a side view of the dovetail plate and offset angle plate of the assembly of FIGS. 4 and 5.
Figure 9:
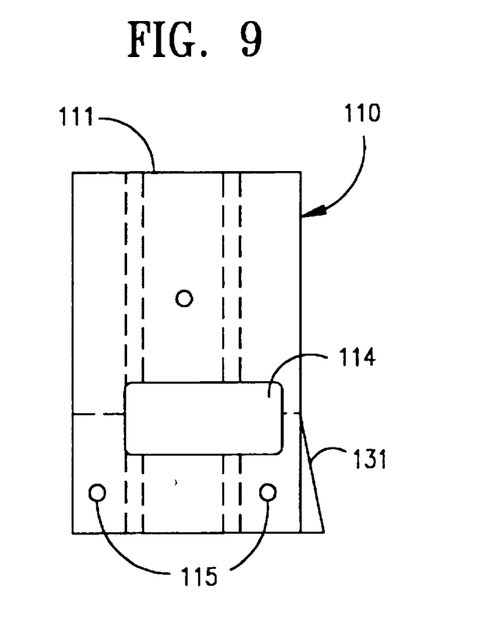
FIG. 9 is a top view of the dovetail plate and offset angle plate of FIG. 8.

As shown in FIG. 8, the offset angle plate 130 is bolted to the underside 116 of the dovetail plate 110. The offset angle plate 130 is generally less than about half the height of the dovetail plate 110. FIG. 9 shows the window cutout 114 in the dovetail plate 110. The offset angle plate 130 includes a half-window cutout 133 (FIG. 4) to complement the half-window cutout 125 of the locator block 120. The window cutout 114 and the half-window cutouts 133, 125 are aligned to form the window 134 (FIG. 3). The offset angle plate 130 (FIG. 8) and dovetail plate 110 are bolted together by machine screws 115.

In a preferred embodiment, the offset angle plate 130 and dovetail plate 110 are never disassembled. The gage 20 may include different dovetail plate/offset angle plate sets wherein an identical dovetail plate 110 is provided for a plurality of offset angle plates 130, each having different sizes to fit different applications. For example, the gage 20 may be provided with six plate sets, for one to six degrees of offset angle. When an application calls for a different offset angle, an appropriate offset angle is provided by disconnecting the dovetail plate 110 with the offset angle plate 130 from the locator block 120 and substituting another dovetail plate 110 bearing another offset angle plate 130.

Although each dovetail plate 110 is identical to every other, because of the precision of the dovetail arrangement at the interface between the dovetail plate 110 and the locator block 120, a high level of accuracy of positioning of the offset angle edge 131 is achieved. Moreover, this arrangement provides for simple, quick changing of offset angles.

The preceding discussion and FIGS. 4 through 9 relate to the left-handed locator collar assembly 100. Note that the entire discussion readily applies also to the right-handed collar assembly 200, shown in FIG. 3. The right-handed collar assembly 200 is a mirror image of the left-handed collar assembly 100.

Figures 10, 11:
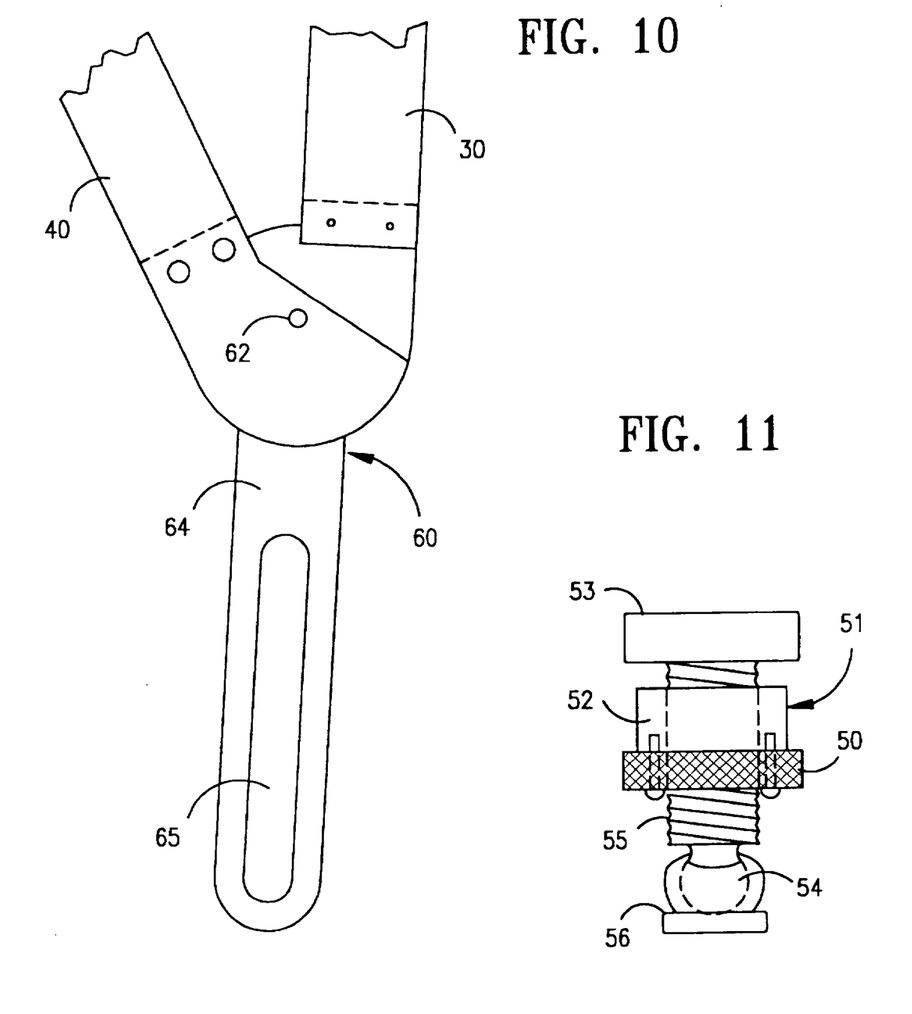
FIG. 10 is a bottom view of the protractor tail of the gage of FIG. 1.
FIG. 11 is a sectional view taken along line XI—XI of FIG. 1.

FIG. 11 is a detailed view of the guide bar gage foot assembly 51. The assembly 51 has a threaded sleeve 52, a threaded portion 55 threaded into the sleeve 52, a base end 56, and a ball and socket joint 54 for pivotally connecting the base end 56 to the threaded portion 55. A knob 53 may be provided for rotating the threaded portion 55 to adjust the height of the sleeve 52 above the support surface 71. The threaded sleeve 52 is bolted or otherwise secured to the guide bar 50. Turning the foot leg 53 raises or lowers the gage 20.

Figure 2:
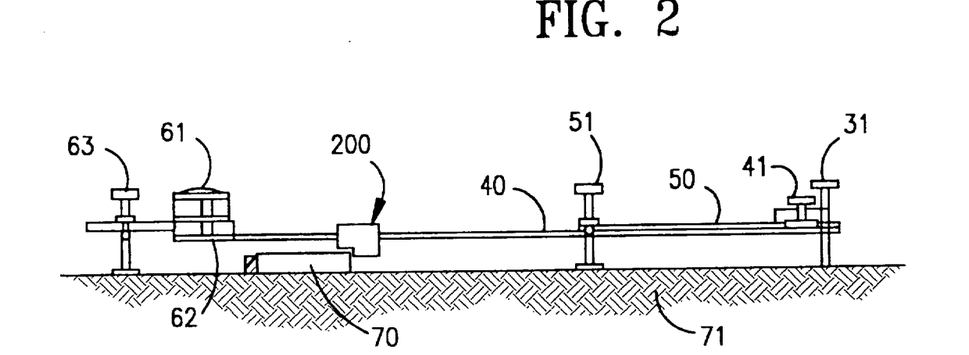
FIG. 2 is a right side view of the gage of FIG. 1.
Figure 12:
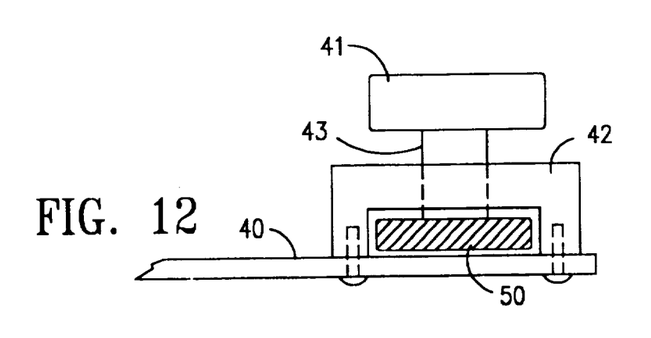
FIG. 12 is a sectional view taken along line XII—XII of FIG. 1.

FIG. 12 shows the collar 41 for adjustably fixing the end of the pivoting scale arm 40 at different positions along the length of the guide bar 50. The collar 41 has a C-shaped member 42 that surrounds the guide bar 50 and that is connected to the scale arm 40 at opposite ends. A threaded screw 43 extends through the C-shaped member 42. The C-shaped member 42 is rotated to press the guide member 50 against the scale arm 40. This arrangement keeps the pivoting scale arm 40 positioned within the same plane as the fixed scale arm 30 and the guide bar 50 as shown in FIG. 2.

FIGS. 13 through 16 illustrate a gage 290 constructed in accordance with an alternative embodiment of the present invention. The overall operation and construction of the gage 290 is similar to the operation and construction of the gage 20. However, in the FIG. 13 embodiment, the collar assemblies 300, 400 each contain only a locator block 320, 420 and an offset angle plate 330, 430. The embodiment shown in FIG. 13 omits the window 134 and dovetail plate 110 of the embodiment shown in FIGS. 1 through 9.

Figure 14:
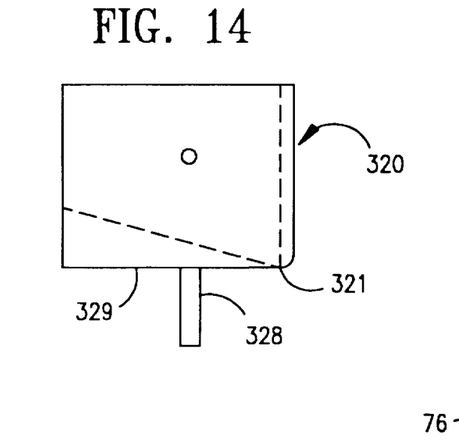
FIG. 14 is a top view of a locator block for the gage of FIG. 13.

As shown in FIG. 14, the locator block 320 has a seal contact edge 321 and a plate rod 328. Because the collar assembly 300 omits the dovetail plate 110, the face of the locator block 320 omits the dovetail arrangement and provides only a flat surface. The alternate locator block 320 further omits a half-window cutout.

Figure 15:
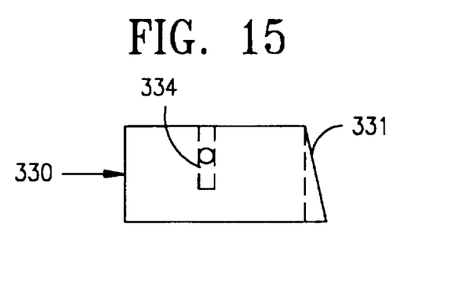
FIG. 15 is a top view of an offset angle plate for the gage of FIG. 13.

FIG. 15 shows the configuration of the offset angle plate 330. The offset angle plate 330 constitutes an offset angle edge 331 and a locator block slot 334. In an assembled condition, the plate rod 328 fits within the locator block slot 334 to couple the locator block 320 and offset angle plate 330 together. The offset angle plate 330 is fixed to the locator block 320 by a single machine screw 315 (FIG. 16).

The right-hand locator block assembly 400 is a mirror image of the left-hand locator block assembly 300.

Figure 13:
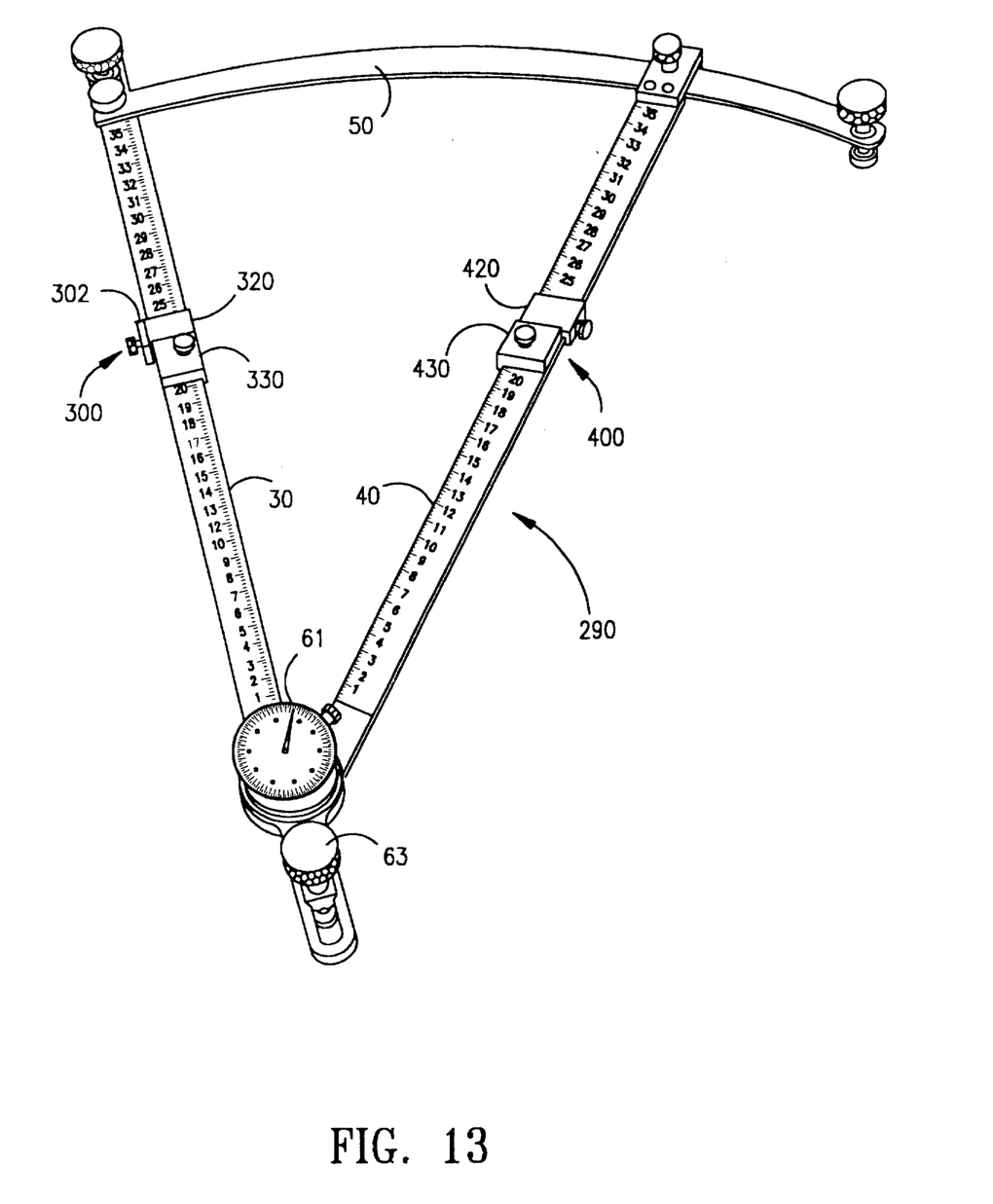
FIG. 13 is a perspective view of a gage constructed in accordance with another preferred embodiment of the present invention.

The design of the alternative embodiment for the locator collar assemblies 300, 400 permits slightly different modes of operation of the claimed invention. A first mode of operation is shown in FIG. 13, where the operator determines the height of the locator block 320. The appropriate height may be determined by measurement or it may be provided by the manufacturer. The operator visually compares the top surface of the locator block 320 against the scale arm 30, and, given the height of the locator block 320, calculates the distance of the assembly from the hinge point 62. The right-hand assembly 400 is located in a similar manner. This embodiment and method of use is a preferred embodiment due to its ease of manufacture and method of use.

Figure 16:
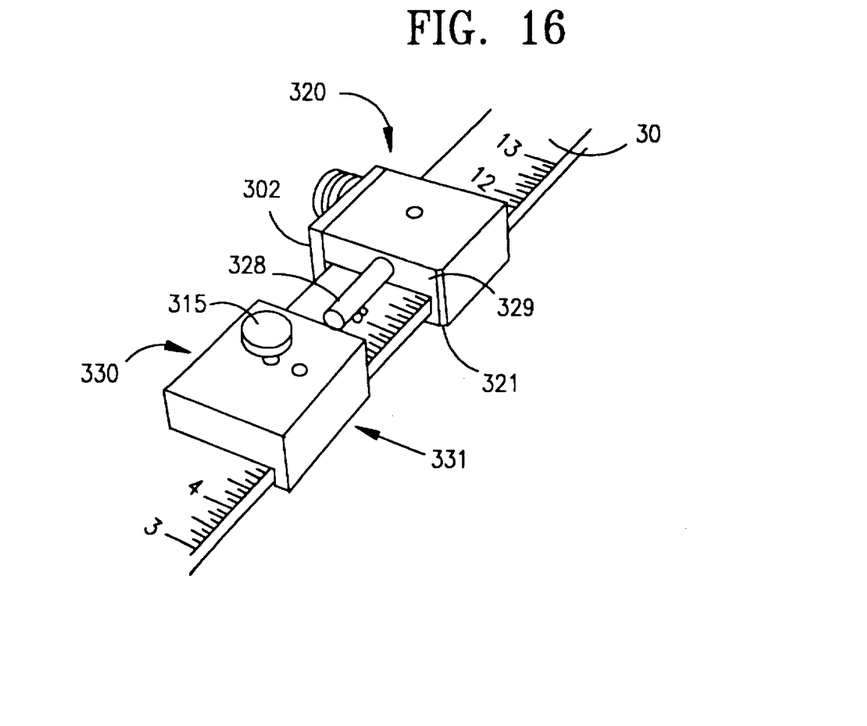
FIG. 16 is a partial perspective view of the gage of FIG. 13, in a partially disassembled position.

In a second mode of operation, shown in FIG. 16, the operator assembles the locator block 320 and the locator block plate 302 to provide a partial subassembly. The operator visually compares the lower straight edge 329 of the locator block 320 against the graduated scale arm 30 to determine the distance of the subassembly from the hinge point 62. Once the operator appropriately positions and fixes the subassembly to the scale arm 30 for operation, the operator then couples the offset angle plate 330 to the subassembly and marks the seal 70.

As shown in FIG. 10, the fixed scale arm 30 is connected by bolts to the protractor tail 64. The pivoting scale arm 40 is pivotally connected to the protractor tail 64 at the hinge point 62. The hinge point 62 is actually an extension of the protractor dial 61 as shown in FIG. 2. The protractor tail slot 65 is cut into the protractor tail 64 to slidably accommodate the gage foot 63.

The protractor gage foot 63 is substantially the same as the other gage feet, differing in only one material respect. The protractor gage foot 63 must allow for variable positioning throughout the protractor tail slot 65, so it can be moved out of the way to not interfere with certain diameter seals. Consequently, the foot collar is made of two collar halves which are coupled by a threaded connection. This connection allows the collar assembly to be positioned and tightened anywhere within the protractor tail slot 65.

Figure 17:
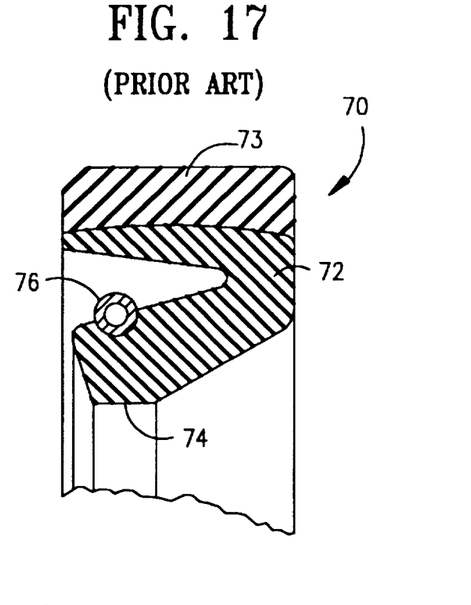
FIG. 17 is a cross sectional view of an annular seal.

Referring now to FIG. 17, the seal 70 has a main portion 72 formed of homogenous rubber, an inner diameter portion 74, and a spring 76 for biasing the inner diameter portion 74 onto the surface of a shaft (not shown) to be sealed. A fiber reinforced rubber circumferential portion 73 may be located around the circumference of the main portion 72. Preferably, the inner diameter of the seal 70 is the same as the outer diameter of the shaft prior to assembly of the seal 70 onto the shaft. As a result, the seal 70 does not stretch over the shaft and the inner diameter portion 74 does not pull apart at the point where the seal 70 has been cut. The seal 70 relies on the spring 76 to provide interference on the shaft and maintain a tight joint. In the illustrated embodiment, the inner diameter portion 74 (the portion in contact with the shaft) is elongated in the axial direction of the shaft. The inner diameter portion 74 does not form a line contact area circumferentially of the shaft. This ensures that the desired sealing function is achieved even when the split ends of the seal are slightly misaligned.

The above description and drawings are only illustrative of preferred embodiments which achieve the objects, features and advantages of the present invention, and it is not intended that the present invention be limited thereto. Any modifications of the present invention coming within the spirit and scope of the following claims is to be considered part of the present invention.

What is claimed as new and desired to be protected by Letters Patent of the United States is:

1. A seal splitter gage comprising:
   first and second pivotally connected arms;
   protractor means for determining the angular displacement between said pivotally connected arms; and
   first and second collar assemblies for said first and second arms, respectively, said collar assemblies having edges for orienting a seal with respect to the gage; and
   offset angle means for providing cutting or marking edges for cutting the seal at angles offset from radial lines extending from a center of the seal to the respective edges of the collar assembly when the seal is oriented with respect to the gage.

2. A gage as claimed in claim 1, wherein said protractor means comprises a gear driven dial coupled to said pivotally connected arms.

3. A gage as claimed in claim 1, wherein said protractor means includes a curved guide bar having a center at the point of connection of said pivotally connected arms, said guide bar being rigidly connected to said first arm, and wherein said guide bar includes means for determining the position of said second arm with respect to said first arm.

4. A gage as claimed in claim 3, further comprising a collar for movably connecting said second arm to said guide bar.

5. A method of forming a second annular seal from a first annular seal, said method comprising the steps of:
   determining cutting lines by (a) positioning first and second collar assemblies at desired positions on pivoted arms, (b) positioning said first annular seal with respect to said collar assemblies, and (c) providing the cutting lines at an angle offset from a line extending from the center of the seal to the collars;
   cutting said first annular seal along said cutting lines and thereby forming cut seal ends; and
   joining said cut seal ends together.

6. The method of claim 5, further comprising the step of removing said collar assemblies from said arms and replacing said collar assemblies with third and fourth collar assemblies, said third and fourth collar assemblies being different than said first and second collar assemblies.

7. The method of claim 5, wherein said collar assemblies include means for connecting said collar assemblies to said arms and angled means for defining said cutting lines.

8. The method of claim 7, further comprising the step of pivoting said arms with respect to each other prior to said cutting step.

9. The method of claim 8, wherein said step of pivoting said arms includes the step of moving said second arm with respect to a curved guide bar.

* * * * *